US008873352B1

(12) United States Patent
Jandric et al.

(10) Patent No.: US 8,873,352 B1
(45) Date of Patent: Oct. 28, 2014

(54) LIGHT MITIGATION LAYER BETWEEN WRITE POLE AND WAVEGUIDE

(71) Applicant: Seagate Technology LLC, Cupertino, CA (US)

(72) Inventors: Zoran Jandric, St. Louis Park, MN (US); Chris Rea, Edina, MN (US); Pierre Asselin, Richfield, MN (US); Michael Thomas Johnson, Minneapolis, MN (US); Manuel Charles Anaya-Dufresne, Edina, MN (US); John C. Duda, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/206,683

(22) Filed: Mar. 12, 2014

(51) Int. Cl.
*G11B 11/00* (2006.01)

(52) U.S. Cl.
USPC ................. 369/13.33; 369/13.13; 369/112.27

(58) Field of Classification Search
CPC ..................... G11B 5/4866; G11B 2005/0021; G11B 5/6088; G11B 2005/001; G11B 7/1387; G11B 11/10554; G11B 11/1058; G11B 7/1384; G11B 7/1206
USPC .......... 369/13.33, 13.32, 13.24, 13.14, 13.03, 369/13.02, 13.12, 13.13, 13.22, 13.01, 369/13.35, 112.27; 360/59, 125.31
See application file for complete search history.

(56) References Cited

U.S. PATENT DOCUMENTS

| 6,069,853 | A | 5/2000 | Novotny et al. |
|---|---|---|---|
| 7,181,096 | B2 * | 2/2007 | Matsumoto et al. ............ 385/12 |
| 7,609,480 | B2 | 10/2009 | Shukh et al. |
| 7,621,677 | B2 * | 11/2009 | Yang et al. ...................... 385/88 |
| 7,957,099 | B2 | 6/2011 | Tanaka et al. |
| 8,547,804 | B2 | 10/2013 | Shimizu |
| 2006/0093262 | A1 | 5/2006 | Matsumoto et al. |
| 2009/0052833 | A1 | 2/2009 | Yang et al. |

* cited by examiner

*Primary Examiner* — Ali Neyzari
(74) *Attorney, Agent, or Firm* — Hollingsworth Davis, LLC

(57) ABSTRACT

An apparatus has a near-field transducer located proximate a media-facing surface of a slider magnetic recording heat. A waveguide is configured to couple light to the near-field transducer and includes a top cladding layer facing the near-field transducer, a bottom cladding layer, and a core layer between the top and bottom cladding layers. The apparatus includes a write pole with a flat portion substantially parallel to the core layer and a sloped portion extending from the flat portion of the write pole towards the media-facing surface at an angle to the core layer and to the media-facing surface. A light mitigation layer is located between the top cladding layer and the write pole.

20 Claims, 8 Drawing Sheets

LIGHT MITIGATION LAYER BETWEEN WRITE POLE AND WAVEGUIDE

SUMMARY

The present disclosure is generally directed to optical transmission paths used in magnetic recording. In one embodiment, an apparatus includes a near-field transducer located proximate a media-facing surface of a slider magnetic recording heat. A waveguide is configured to couple light to the near-field transducer and includes a top cladding layer facing the near-field transducer, a bottom cladding layer, and a core layer between the top and bottom cladding layers. The apparatus includes a write pole with a flat portion substantially parallel to the core layer and a sloped portion extending from the flat portion of the write pole towards the media-facing surface at an angle to the core layer and to the media-facing surface. A first light mitigation layer is located between the top cladding layer and the write pole. In other embodiments, a second light mitigation layer is located adjacent the bottom cladding layer away from the core layer of the waveguide instead of or in addition to the first light mitigation layer.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Various embodiments disclosed herein are generally directed to managing stray light transmitted through an optical device. Examples disclosed herein include optical transmission paths of a heat-assisted magnetic recording (HAMR) read/write head (also sometimes referred to as a "slider"). The optical transmission paths have features that mitigate the effects of stray light that may propagate through the slider during operation. Among other things, these features can help manage heat-induced protrusion at a media-facing surface of the slider and improve efficiency of the device.

Figure 1:
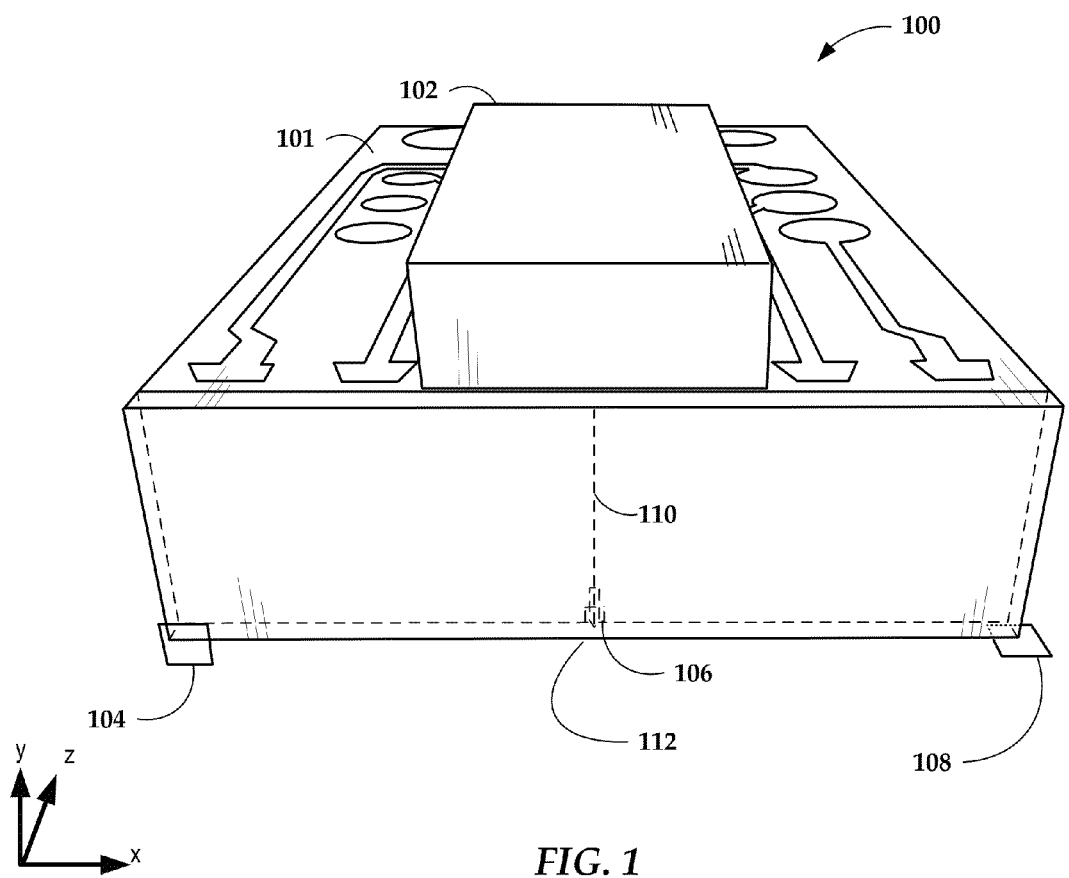
FIG. 1 is a perspective view of a hard drive slider according to an example embodiment.

In FIG. 1, a perspective view shows a HAMR hard drive slider according to an example embodiment. The HAMR slider 100 includes laser diode 102 located on top of and proximate to a trailing edge surface 104 of a slider body 101. The laser diode 102 delivers light proximate to a read/write transducer 106, which is proximate an air-bearing surface 108 (also referred to as a "media-facing surface") of the slider body 101. The air-bearing surface 108 is held proximate to a moving media surface (not shown) during device operation. The read/write transducer 106 may include, among other things, a magnetoresistive reader element and a magnetic write coil that energizes a write pole.

The laser diode 102 provides electromagnetic energy to heat the media surface as it passes by the read/write transducer 106. Optical coupling components, such as a waveguide 110 and near-field transducer (NFT) 112, are formed integrally within the HAMR slider 100 to deliver light from laser diode 102 to a region proximate the read/write transducer 106. The light energizes the NFT 112, which provide local heating of the media during write operations. The laser diode 102 in this example may be an integral, edge-emitting device, although it will be appreciated that the waveguide 110 and NFT 112 may be used with any light source. For example, a surface emitting laser (SEL) may be used instead of an edge-emitting laser, and a laser may be mounted elsewhere, or in different orientation, e.g., on the trailing edge surface 104 of the slider body 101.

While the example in FIG. 1 shows the laser diode 102 integrated with the HAMR slider 100, the NFT 112 discussed herein may be useful in any type of light delivery configuration. For example, in what is referred to as free-space light delivery, a laser may be mounted externally to the slider, and coupled to the slider by way of optic fibers and/or waveguides. The slider in such an arrangement may include a grating coupler into which light is coupled and delivered to slider-integrated waveguide 110 which energizes NFT 112.

Figure 2:
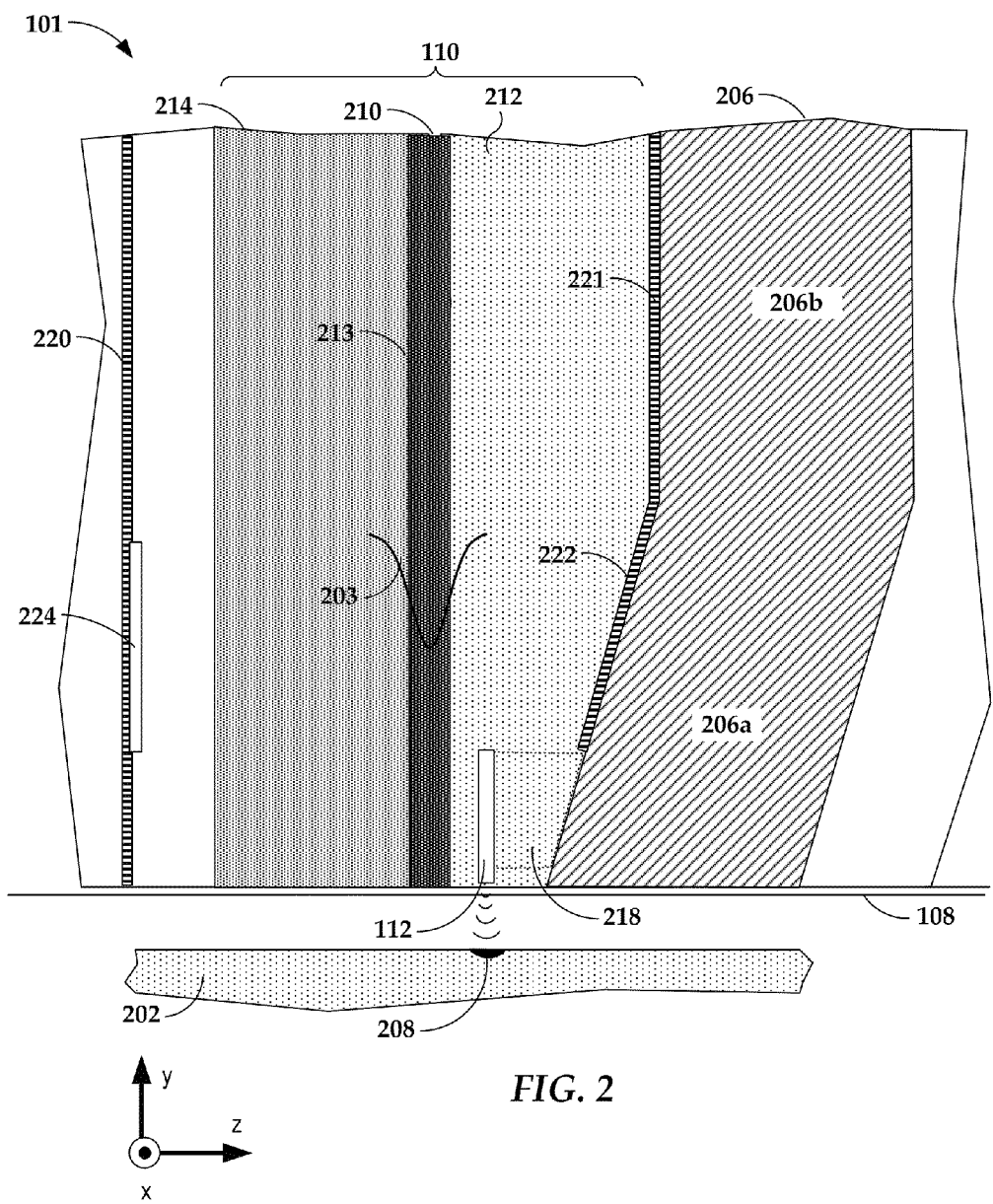
FIG. 2 is a cross-sectional view of a portion a hard drive slider according to an example embodiment.

In FIG. 2, a cross-section diagram illustrates features of a slider body 101 according to an example embodiment. The waveguide 110 is configured to receive electromagnetic energy 203 from an energy source (e.g., laser 102 in FIG. 2). The waveguide 110 includes a layer of core material 210 surrounding by cladding layers 212, 214. The core layer 210 and cladding layers 212, 214 may be made from dielectric materials selected so that the refractive index of the core layer 210 is higher than refractive indices of the cladding layers 212, 214. This arrangement of materials facilitates efficient propagation of light through the waveguide 110. While the illustrated NFT 112 is shown located in cladding layer 212, the NFT 112 in this and other embodiments described herein may be located elsewhere, e.g., in core layer 213, cladding layer 214, and/or interfaces therebetween. Further, optical focusing elements (not shown) such as mirrors, lenses, etc., may also be utilized to concentrate light onto the NFT 112.

The electromagnetic energy 203 induces surface plasmon resonance at the NFT 112, and the surface plasmons are directed to create a small hotspot 208 (e.g., 60 nm or smaller) on a recording medium 202 as it moves past the NFT 112 in the downtrack direction (z-direction). The heat lowers magnetic coercivity of the medium 202, allowing a magnetic flux to change magnetic orientation of the medium 202 near the hotspot 208 without changing magnetic orientation outside of the hotspot 208. A magnetic write pole 206 applies the magnetic flux near the media-facing surface 108 in response to an applied current.

The write pole 206 includes a sloped portion 206a and a flat portion 206b. The flat portion 206b is substantially parallel to the core layer 213 of the waveguide 110. The sloped portion 206a extends from the flat portion 206b towards media-facing surface 108 at an angle to the core layer 213. The sloped portion 206a facilitates generating a magnetic field in close proximity to the NFT 112 during recording.

Because the energy 203 is focused in a relatively small volume of the slider body 101, significant temperature increases are seen near the NFT 112 during recording. This is due to, among other things, optical inefficiency of the energy transmission path and absorption of energy in the NFT 112 and its vicinity. The temperature rise can affect mechanical stability of the NFT 112, and cause unwanted protrusion of the NFT 112 at the media-facing surface 108 due to thermal expansion. The NFT 112 may include a heat sink portion 218 that conducts heat away from the NFT 112 to the sloped portion 206a of the write pole.

Other effects besides heating of the NFT 112 can be caused by optical inefficiency of the energy transmission path. For example, only a portion of the light from the originating from laser is directed through waveguide 110 and focused onto the NFT 112. Through effects such as reflection, leakage, etc., stray light energy can escape from the intended propagation paths and spread through the slider body 101. If the stray light energy reaches the region near the write pole 206 and NFT 112, this can increase local temperatures and in some cases impacts efficiency of the light path near the NFT 112 (e.g., interference or cancellation of light waves). As such, the illustrated slider body includes light mitigation layers 220-222 to reduce effects of stray light.

The light mitigation layers can mitigate the effects of stray light near the NFT 112 by reflecting stray light energy back upwards into the slider body 101 and/or by absorbing stray light energy. Light mitigation layer 220 is located on a side of the waveguide that is opposite to the write pole. Light mitigation layers 221 and 222 are on respective straight and sloped portions of the write pole 206, between the write pole 206 and the waveguide 110. Light mitigation layers 220-222 can include reflective materials such as gold, silver, and aluminum, and/or can include materials that can absorb extraneous light from the laser diode thereby stopping its propagation throughout the slider.

In some embodiments, the light mitigation layers 220-222 may include a photovoltaic material that can convert some of the stray light to electrical current. In these embodiments, the electrical current can be coupled to a heating element. The heating element can affect local thermal expansion, and thereby assist in affecting or controlling a protrusion at the media-facing surface. The photovoltaic material may have also reflect and absorb some part of the stray light energy as described for other materials.

Light mitigation layers 220-222 may include materials with high light absorption at the wavelength of the laser diode (e.g., 700-1550 nm). Such materials can include nickel, chromium, ruthenium, or phenyl C61-butyric acid methyl ester (PCMB[6,6]). Other absorptive materials that are useful as light mitigation layers include ceramic/metal matrix materials such as Cu—$SiO_2$, plasmonic nanospheres/wires, lossy stacked diffraction gratings, or metal materials used by solar cell technologies.

The light mitigation layers 220-222 may include any combination of absorptive and reflective materials. Generally, absorptive regions capture the stray light at a predefined location, thereby providing better control of protrusion and other temperature-induced effects. Reflective regions may be configured to reflect light away from components at the media-facing surface 108, such as the NFT 112, write pole 206, and reader stack (not shown). The light may also be reflected away from other components that are not located near the media-facing surface 108, but that may cause unwanted, heat-induced protrusion. For example, the light mitigation layers 220-222 may be configured to direct stray light away from as magnetic coils (not shown) that generate magnetic fields through the write pole 206 and return poles (not shown).

Besides helping control protrusion at the media-facing surface 108, the light mitigation layers can improve contact and clearance detection. Generally, the protrusion at the media-facing surface 108 is controlled (e.g., via a heater) to maintain a desired clearance between the recording medium 202 and the read/write transducers. In order to sense the clearance, the slider may include a temperature sensor near the media-facing surface 108. The profile of temperature versus clearance measured by this sensor can be used to estimate clearance, and as well as detecting contact between the slider body 101 and the recording medium 202. For example, when contact is first initiated, temperature will drop noticeably near the contact region due to conduction of heat away from the slider body 101 by the recording medium 202.

Some of the light mitigation layers 220-222 may be placed so to help ensure the contact region (e.g., region of maximum protrusion) is shifted away from sensitive mechanical components such as the NFT 112, and toward the location of light mitigation layer 220. A thermal sensor 224 may be placed close to an absorbing light mitigation layer 220-222, potentially increasing the sensor's sensitivity to laser light. If the light mitigation layer includes a dielectric-based absorber, the thermal sensor 224 can be embedded within the absorber. Otherwise the sensor 224 can be placed within the adjacent optical layers.

Figure 3:
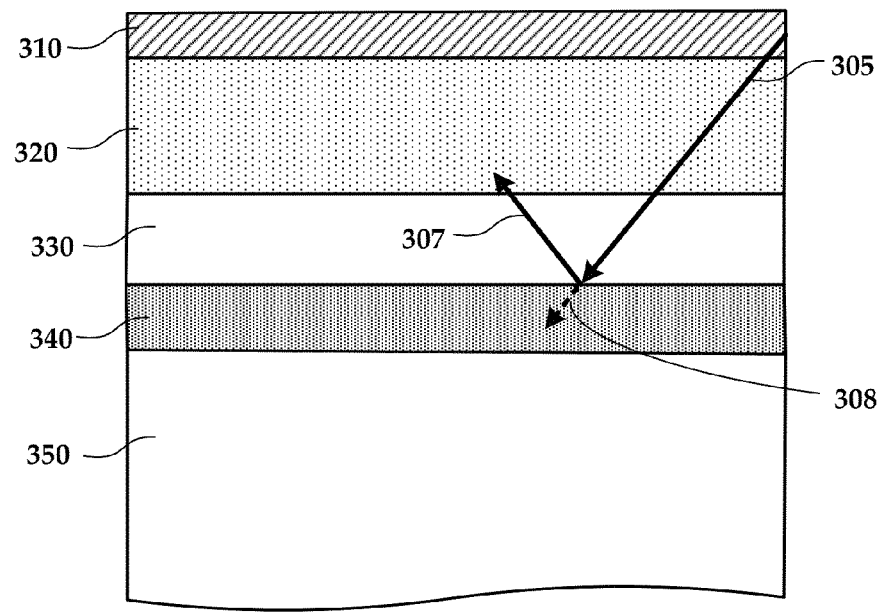
FIGS. 3 and 4 are cross-sectional views of light mitigation layers according to an example embodiment.

In FIG. 3, a block diagram includes a cross-sectional view of a portion of light mitigation layers according to an example embodiment. Stray light 305 that originates and/or escapes from a waveguide core 310 travels through a bottom cladding layer 320 of the waveguide. The stray light 305 propagates through a dielectric layer 330 (e.g., $Al_2O_3$) to a light mitigation layer 340. The light mitigation layer 340 is adjacent to layer 350, which may be a dielectric layer, e.g., fill material between the waveguide and a return pole. In other configurations, the layer 350 may include a write or return pole, e.g., as shown for light mitigation layers 221 and 222 proximate write pole 206 in FIG. 2.

The light mitigation layer 340 reflects a first portion 307 of the stray light 305 and absorbs a second portion 308 of the stray light 305. The amount of reflected and absorbed portions 307, 308 is a property of, among other things, the material used to form the light mitigation layer 340, the thickness of the layer 304, and the surface properties of the layer 304. For example, upper and/or lower surfaces of the light mitigation layer 340 may be formed so that the reflected portion 307 is diffuse or specular. In another example, a thickness of the light mitigation layer 340 may be selected to increase or reduce internal reflection within the layer 340.

Figure 4:
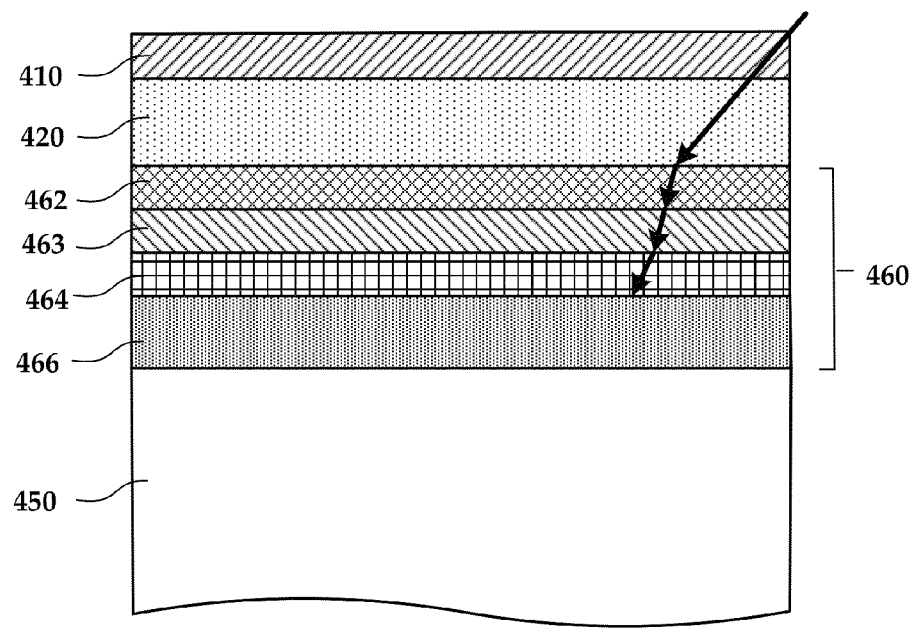

In FIG. 4, a block diagram includes a cross-sectional view of a portion of light mitigation layers according to another example embodiment. Stray light travels from a waveguide core 410 and travels through bottom cladding layer 420 of the waveguide. A light mitigation layer 460 is located between the bottom cladding layer 420 and another material layer 450, which may include a dielectric fill layer, write pole, or other slider structure. The light mitigation layer 460 includes a multi-layer structure with three layers 462-464 in this example. The layers 462-464 include materials with different refractive indices selected to minimize reflection of light back upwards. An absorber layer 466 absorbs light that propagates through layers 462-464, converting the light to heat energy.

The multi-layer structure 462-464 is sometimes referred to as an anti-reflective structure. Each layer the multi-layer structure 462-464 may have a refractive index that progresses incrementally from the refractive index of bottom cladding layer 520 to the refractive index of absorbing layer 466. In some embodiments, the thickness of these anti-reflective optical layers can be less than about 200 nm or less than about ¼ or the wavelength of the stray light. In some embodiment, the anti-reflective optical layers can be integrated with the bottom cladding 214 as shown in FIG. 2, or between the bottom cladding 214 and a return pole.

Figure 5:
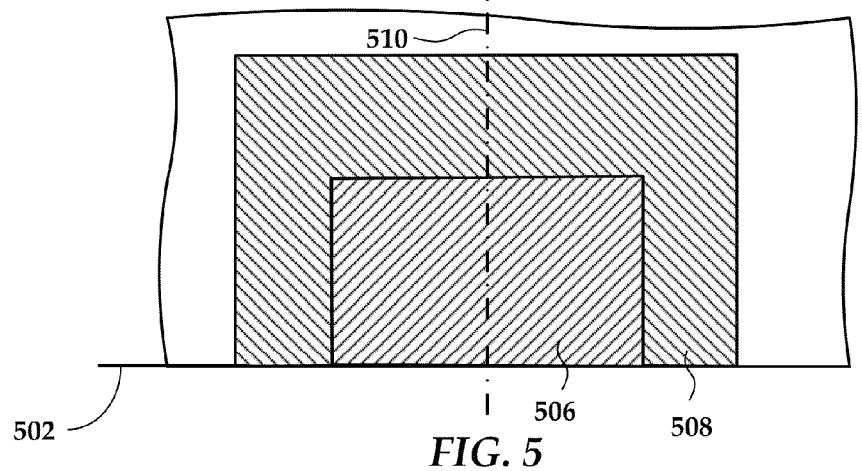
FIGS. 5-7 are cross-sectional views of absorbing layers and heat-diffusion layers according to example embodiments.
Figure 6:
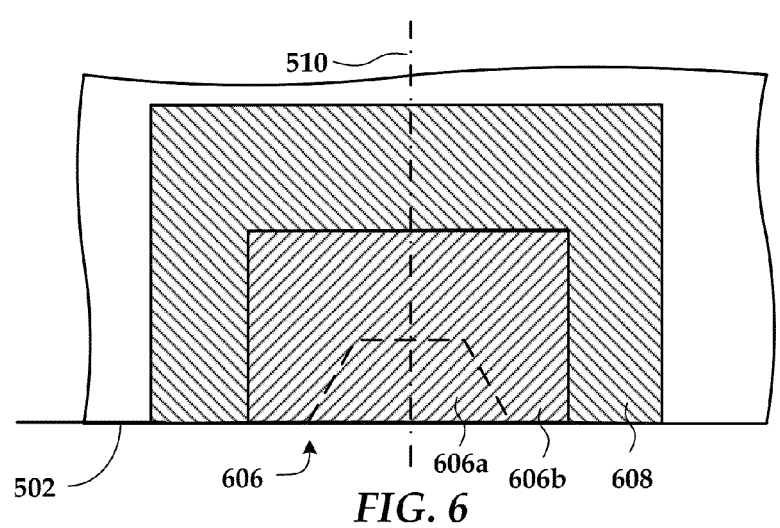
Figure 7:
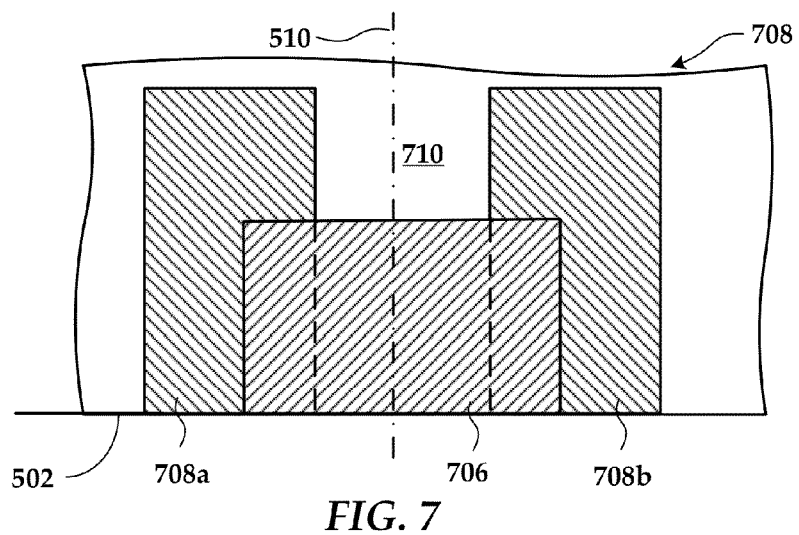

In some embodiments, a heat-diffusing layer can be used together with a light mitigation layer. The heat-diffusing layer is configured to predefine and to control a shape of a local protrusion. For example, a light mitigation layer can absorb stray light, converting the stray light to heat. The heat is conducted to the heat-diffusing layer, which expands in response. In some embodiments, the heat-diffusing layer can include the same material (e.g., ferrous alloy) as a secondary return pole. In other embodiments, portions of a return pole can act as a heat-diffusing layer. In FIGS. 5-7, block diagrams illustrate example embodiments absorbing layers and heat-diffusion layers. These views are cross-track, cross-sections of the slider near a media-facing surface 502. In these figures, centerline 510 indicates relative location of an NFT, which is not shown.

In FIG. 5, a light mitigating layer 506 is surrounded by a diffuser layer 508. The light mitigating layer 506 is located downtrack from an NFT (not shown) as indicated by centerline 510. The light mitigating layer 506 has a shape, size, location, etc. such that at least part of the stray light is intercepted and absorbed. The diffuser layer 508 is in contact with, and in some embodiments, above or below (e.g., overlapping) the light mitigating layer 506. The diffuser 508 conducts heat from the light mitigating layer 506 and expands in response thereto. The shape of the heat diffuser layer 508 (or layers) is used to predefine and control the shape of local protrusion at the media-facing surface 502. For example, a height of the heat diffuser layer 508 extending away from the media-facing surface 502 may be selected to provide a desired amount and/or shape of protrusion.

In FIG. 6, a block diagram illustrates an alternate configuration of a light mitigating layer 606 and diffuser layer 608. The light mitigating layer 606 includes two portions 606a, 606b. The portions 606a-b may be overlapping as shown here, or abutting one another. The portions 606a-b may include different reflection and absorption properties to provide further control of reflection or absorption of stray light. For example, portion 606a is located closer to the NFT, and so may be made less reflective to reduce the chance of reflecting light back to the NFT. The light mitigation layer 606 may include more than the two portions for further control of light mitigation performance. The diffuser 608 may be abutting and/or overlapping the light mitigating layer 606. The diffuser 608 conducts heat from the light mitigating layer 606 and expands in response thereto, controlling protrusion as previously described.

In FIG. 7, a block diagram illustrates an alternate configuration of a light mitigating layer 706 and diffuser layer 708. The diffuser layer 708 includes two portions 708a-b that overlap light mitigation layer 706 and include a gap 710 therebetween. The diffuser 708 conducts heat from the light mitigating layer 706 and expands in response thereto, controlling protrusion as previously described. The use of two portions 708a-b having a gap in between may help flatten or reduce protrusion near the NFT. The NFT is located downtrack, and has a cross track location indicated by centerline 510. It will be understood that features of the embodiments shown in FIGS. 5-7 may be used together. For example, a multi-layer mitigation layer 606 may be used together with a multi-portion diffuser 708.

Figure 8:
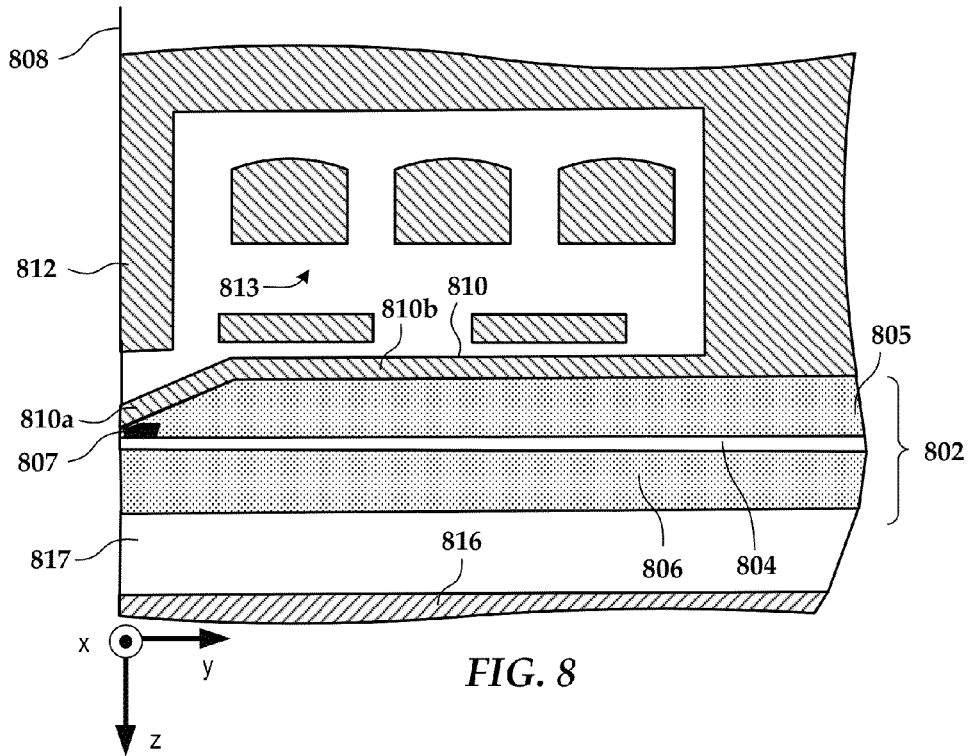
FIGS. 8-13 are illustrations light mitigation layers at various locations according to example embodiments.

Thermo-optical modeling was performed to determine the heat-reduction effect of light mitigation layers in various locations of a slider near a media facing surface. In FIGS. 8-13, cross sectional diagrams show the locations of the light mitigation layers according to example embodiments. The diagram of FIG. 8 represents a baseline configuration and is discussed in detail. The description of components of FIG. 8 is generally applicable to like-named components of FIGS. 9-13. The coordinate system in FIG. 8 uses the same convention as the coordinate systems in FIGS. 1 and 2, and is applicable to all of FIGS. 8-13.

A waveguide 802 includes core layer 804 that is surrounded by top and bottom cladding layers 805, 806. The waveguide 802 delivers light to an NFT 807 near a media-facing surface 808. A write pole 810 has two sections: a sloped section 810a near the NFT 807 and flat portion 810b. An upper return pole 812 is coupled to the write pole 810, which are both proximate to coils 813. A second, lower return pole 812 is located on the other side of the write pole 810. Although, not shown in this diagram, the lower return pole 816 is coupled to the write pole 810 and first return pole 812, as well as being magnetically coupled to coils 813. A dielectric layer 817 separates the bottom cladding layer 806 from the lower return pole 816.

Figure 9:
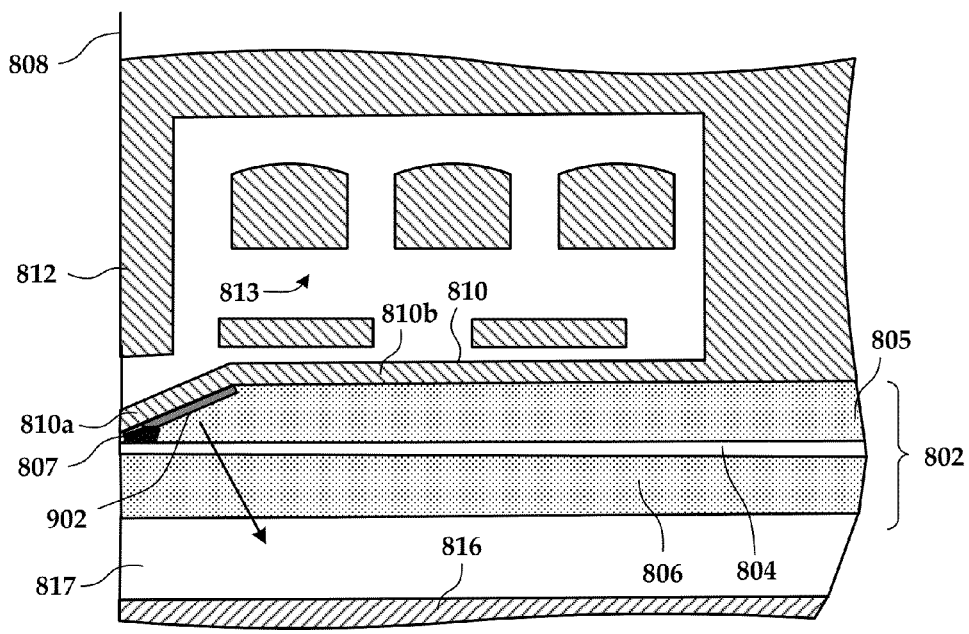

In FIGS. 9-13 show different placement of light mitigation layers, which were modeled as gold layers. In FIG. 9, a light mitigation layer 902 is shown at the interface between the sloped write pole portion 810a and the top cladding layer 805, above the NFT 807. The layer 902 reflects stray light energy away from the media-facing surface and towards the lower return pole 816 as shown by the arrow.

Figure 10:
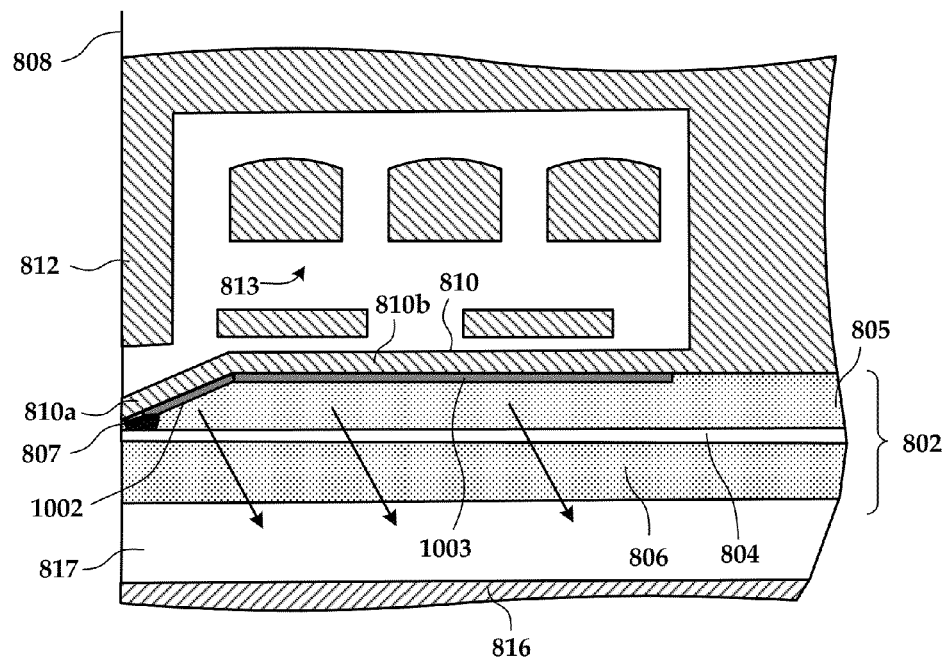
Figure 11:
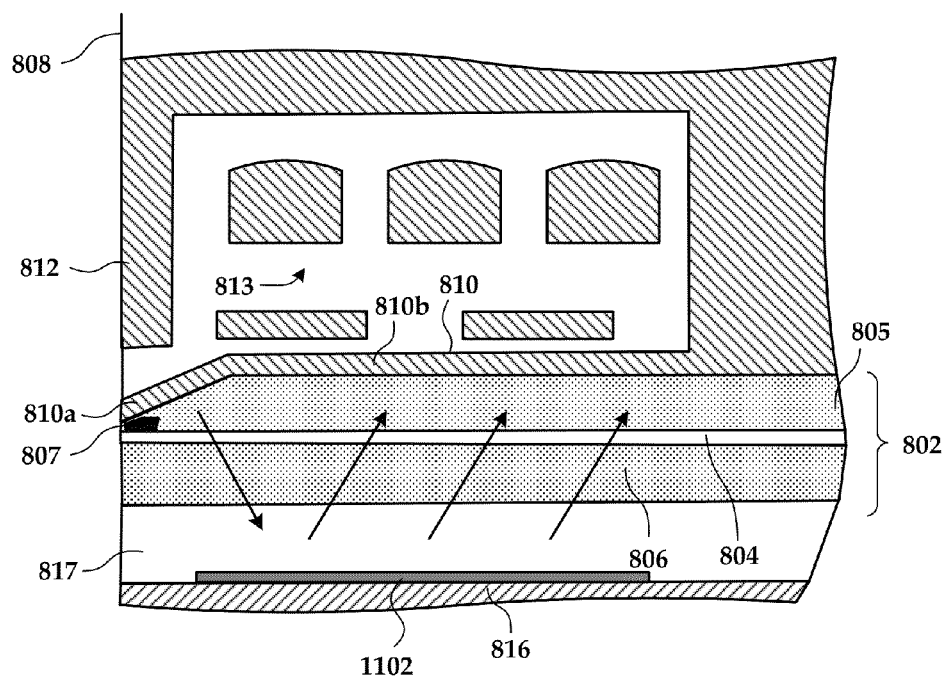
Figure 12:
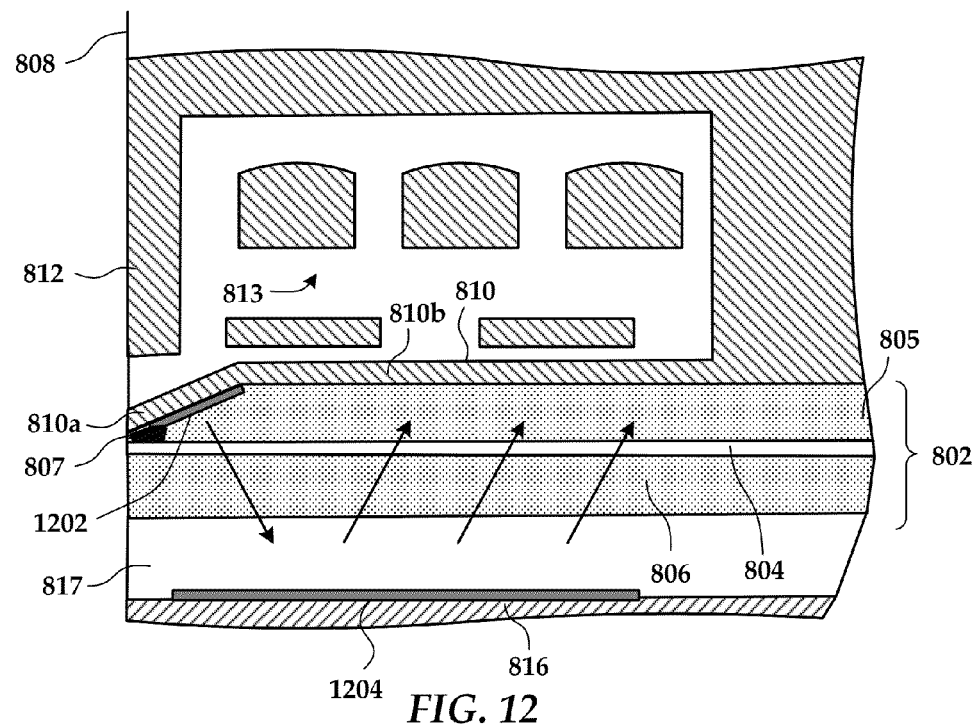
Figure 13:
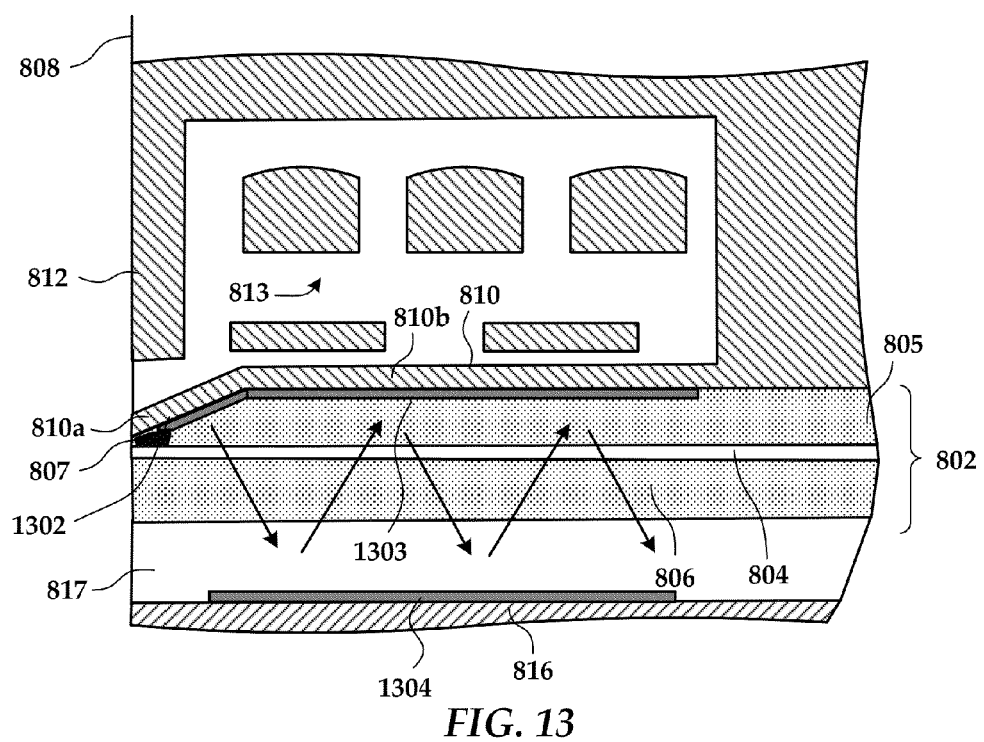

In FIG. 10, a light mitigation layer 1002 is shown on the sloped write pole portion 810a and a light mitigation layer 1003 on the flat write pole portion 810b. Layers 1002 and 1004 reflect stray light energy away from the media-facing surface 808 and towards the lower return pole 816 as shown by the arrows. In FIG. 11, a light mitigation layer 1102 is located on or near the lower return pole 816. As shown by the arrows, this layer 1102 may be configured to reflect light energy back towards the interior of the slider and away from the media-facing surface 808. In FIG. 12, light mitigation layers 1202 and 1204 respectively cover the sloped write pole portion 810a and the lower return pole 816. In FIG. 13, light mitigation layers 1302-1304 respectively cover the sloped write pole portion 810a, the flat write pole portion 810b, and the lower return pole 816. The results of the modelling are shown in Table 1.

TABLE 1

Percent Light Energy Absorbed in Model at Various Locations (% Energy Absorbed)

| Configuration | Sloped Portion of Write Pole | Secondary Write Pole | Flat Portion of Write Pole | Total Energy Absorbed |
|---|---|---|---|---|
| FIG. 8 | 15.3 | 8.3 | 2.8 | 26.4 |
| FIG. 9 | 1.70 | 10.7 | 5.7 | 18.1 |
| FIG. 10 | 1.73 | 13.1 | 2.7 | 19.7 |

TABLE 1-continued

Percent Light Energy Absorbed in Model
at Various Locations (% Energy Absorbed)

| Configuration | Sloped Portion of Write Pole | Secondary Write Pole | Flat Portion of Write Pole | Total Energy Absorbed |
|---|---|---|---|---|
| FIG. 11 | 16.2 | 1.7 | 7.6 | 25.5 |
| FIG. 12 | 2.0 | 2.1 | 13.6 | 17.7 |
| FIG. 13 | 2.4 | 5.3 | 7.5 | 16.2 |

The modelling results show that the light mitigation affects energy distribution within the slider, and can reduce stray light energy in NFT region. The maximum absorption is in the baseline configuration of FIG. 8, and the least absorption is seen in the configuration of FIG. 13. It should also be noted that total energy absorbed is only one aspect to be considered in the design of the slider. The use of different light mitigation layers can significantly change the amount of energy absorbed in a particular region, e.g., by a factor of eight or more. Differing distributions of the stray light energy can be used to draw heat away from the media-facing surface and tune heat-induced protrusion, e.g., by increasing absorption in a region that takes on a preferred shape.

While the examples in FIGS. 8-13 were described as using highly reflective gold light mitigation layers, it will be understood that other types of light mitigation layers described herein, including absorptive, anti-reflective, photovoltaic, etc., may be used in any of the illustrated configurations. Other features may be used in combination with the illustrated layers, including heat diffusers as shown in FIGS. 5-7. For example, heat diffusers can be added to spread heat and tune protrusion shape due to thermal expansion of the diffuser material.

Figure 14:
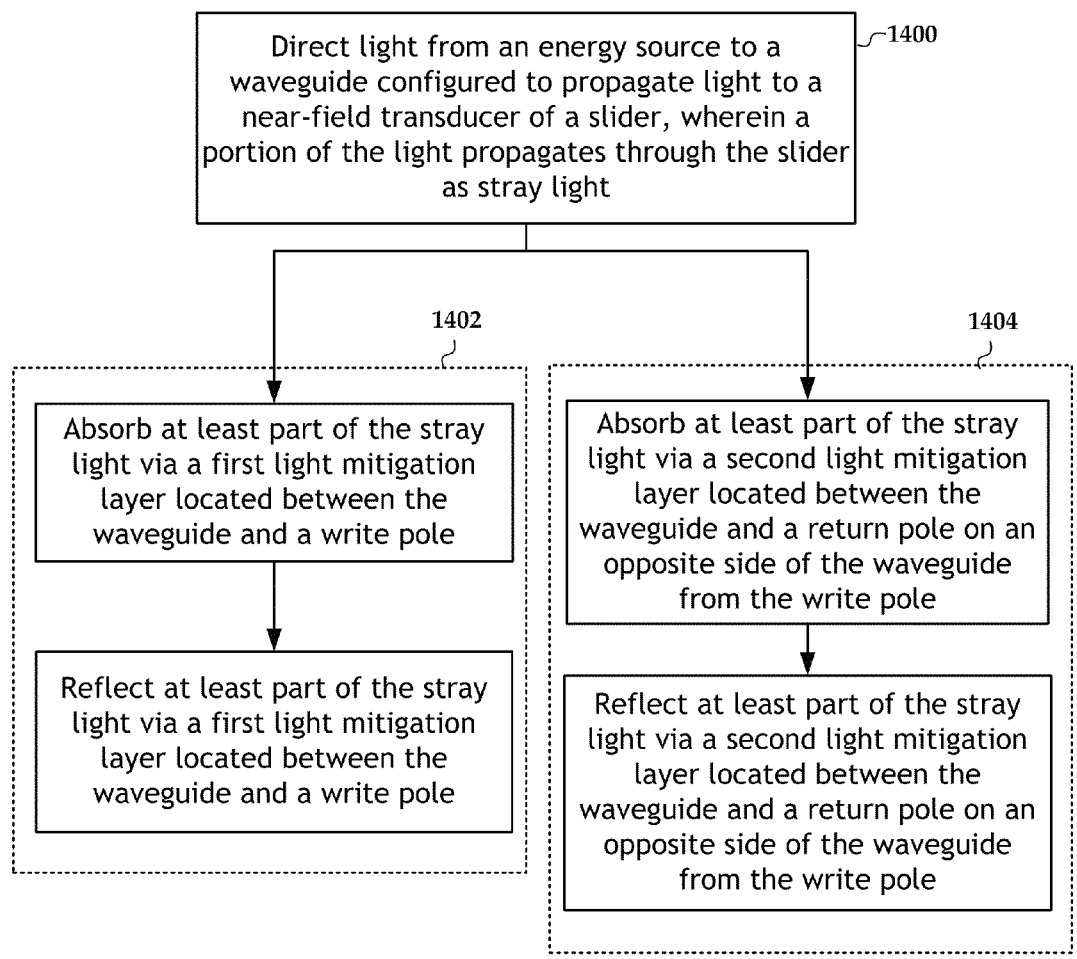
FIG. 14 is a flowchart of a method according to an example embodiment.

In reference now to FIG. 14, a flowchart illustrates a method according to an example embodiment. The method involves directing 1400 light from an energy source (e.g., laser diode) to a waveguide that is configured to propagate light to a near-field transducer of a slider. At least a portion of the light propagates through the slider as stray light, e.g., escapes the waveguide, escapes via a laser-to-waveguide coupler, etc. Blocks 1402 and 1404 represent reflection and/or absorption that may be provided respectively by a first light mitigation layer located between the waveguide and the write pole, and/or a second light mitigation layer located between the waveguide and a return pole on an opposite side of the waveguide from the write pole. The materials and construction features of the layers may be selected to reduce heat concentration, move a maximum protrusion away from the near-field transducer, etc.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus, comprising:
   a near-field transducer located proximate a media-facing surface;
   a waveguide configured to couple light to the near-field transducer, the waveguide comprising a top cladding layer, a bottom cladding layer, and a core layer between the top and bottom cladding layers;
   a write pole facing the top cladding layer, the write pole comprising a flat portion substantially parallel to the core layer and a sloped portion extending from the flat portion of the write pole towards the media-facing surface at an angle to the core layer and to the media-facing surface; and
   a light mitigation layer located between the top cladding layer of the waveguide and at least one of the sloped portion of the write pole and the flat portion of the write pole, the light mitigation layer mitigating effects of stray light on the near-field transducer.

2. The apparatus of claim 1, wherein the light mitigation layer is located between the top cladding layer of the waveguide and both the sloped portion of the write pole and the flat portion of the write pole.

3. The apparatus of claim 1, wherein the light mitigation layer reflects the stray light and comprise gold, silver, aluminum, or an alloy thereof.

4. The apparatus of claim 1, wherein the light mitigation layer absorbs the stray light and comprise at least one of nickel, chromium, and ruthenium.

5. The apparatus of claim 1, wherein the light mitigation layer absorbs the stray light and comprise at least one of a ceramic-metal matrix, plasmonic nano-structures, and stacked diffraction gratings.

6. The apparatus of claim 1, wherein the light mitigation layer is on a plane parallel to the near-field transducer and overlaps the near-field transducer.

7. The apparatus of claim 1, wherein the light mitigation layer reduces heat concentration at the near-field transducer.

8. The apparatus of claim 1, wherein the light mitigation layer causes a maximum protrusion of the media-facing surface to occur away from the near-field transducer.

9. The apparatus of claim 1, wherein the light mitigation layer comprises two or more layers of materials with differing index of refraction selected to minimize reflection of the light back to the near-field transducer.

10. The apparatus of claim 1, wherein the light mitigation layer comprises a photovoltaic material that converts the stray light to electrical current, the electrical current activating a heating element.

11. The apparatus of claim 1, further comprising a thermal sensor proximate the light mitigation layer, the thermal sensor capable of detecting at least one of contact with or clearance between the media-facing surface and a recording media, wherein the light mitigation layer increases sensitivity of the thermal sensor to heating of the apparatus induced by the light.

12. An apparatus, comprising:
   a near-field transducer located proximate a media-facing surface;
   a waveguide configured to couple light to the near-field transducer, the waveguide comprising a top cladding layer facing the near-field transducer, a bottom cladding layer facing away from the near field transducer, and a core layer between the top and bottom cladding layers;

a write pole in contact with the top cladding layer and having an end proximate the media-facing surface; and a light mitigation layer located adjacent the bottom cladding layer away from the core layer of the waveguide, the light mitigation layer mitigating effects of stray light on the near-field transducer.

13. The apparatus of claim 12, wherein the light mitigation layer reflects the stray light and comprises at least one of gold, silver, aluminum, or an alloy thereof.

14. The apparatus of claim 12, wherein the light mitigation layer absorbs light and comprises at least one of a ceramic-metal matrix, plasmonic nano-structures, stacked diffraction gratings, a nickel layer, a chromium layer, and a ruthenium layer.

15. The apparatus of claim 11, wherein the light mitigation layer comprises two or more layers of materials with differing index of refraction selected to minimize reflection of the light back to the near-field transducer.

16. The apparatus of claim 12, wherein the light mitigation layer comprises a photovoltaic material that converts some of the light to electrical current.

17. The apparatus of claim 1, wherein the light mitigation layer reduces heat concentration at the near-field transducer.

18. The apparatus of claim 1, wherein the light mitigation layer causes a maximum protrusion of the media-facing surface to occur away from the near-field transducer.

19. An apparatus comprising:

a near-field transducer located proximate a media-facing surface;

a waveguide configured to couple light to the near-field transducer, the waveguide comprising a top cladding layer, a bottom cladding layer, and a core layer between the top and bottom cladding layers;

a write pole facing the top cladding layer, the write pole comprising a flat portion substantially parallel to the core layer and a sloped portion extending from the flat portion of the write pole towards the media-facing surface at an angle to the core layer and to the media-facing surface;

a first light mitigation layer located between the top cladding layer of the waveguide and at least one of the sloped portion of the write pole and the flat portion of the write pole; and a second light mitigation layer located adjacent the bottom cladding layer away from the core layer of the waveguide.

20. The apparatus of claim 19, further comprising a heat diffusion layer in contact with at least one of the first and second light mitigation layers, wherein the heat diffusion layer is configured to predefine and to control a shape of a protrusion at the media-facing surface.

* * * * *